Jan. 15, 1935.  F. H. POEPPELMEIER  1,987,635
METHOD OF AND MEANS FOR PREPARING FORMS FOR RULED CHARTS AND SHEETS
Filed Dec. 17, 1931
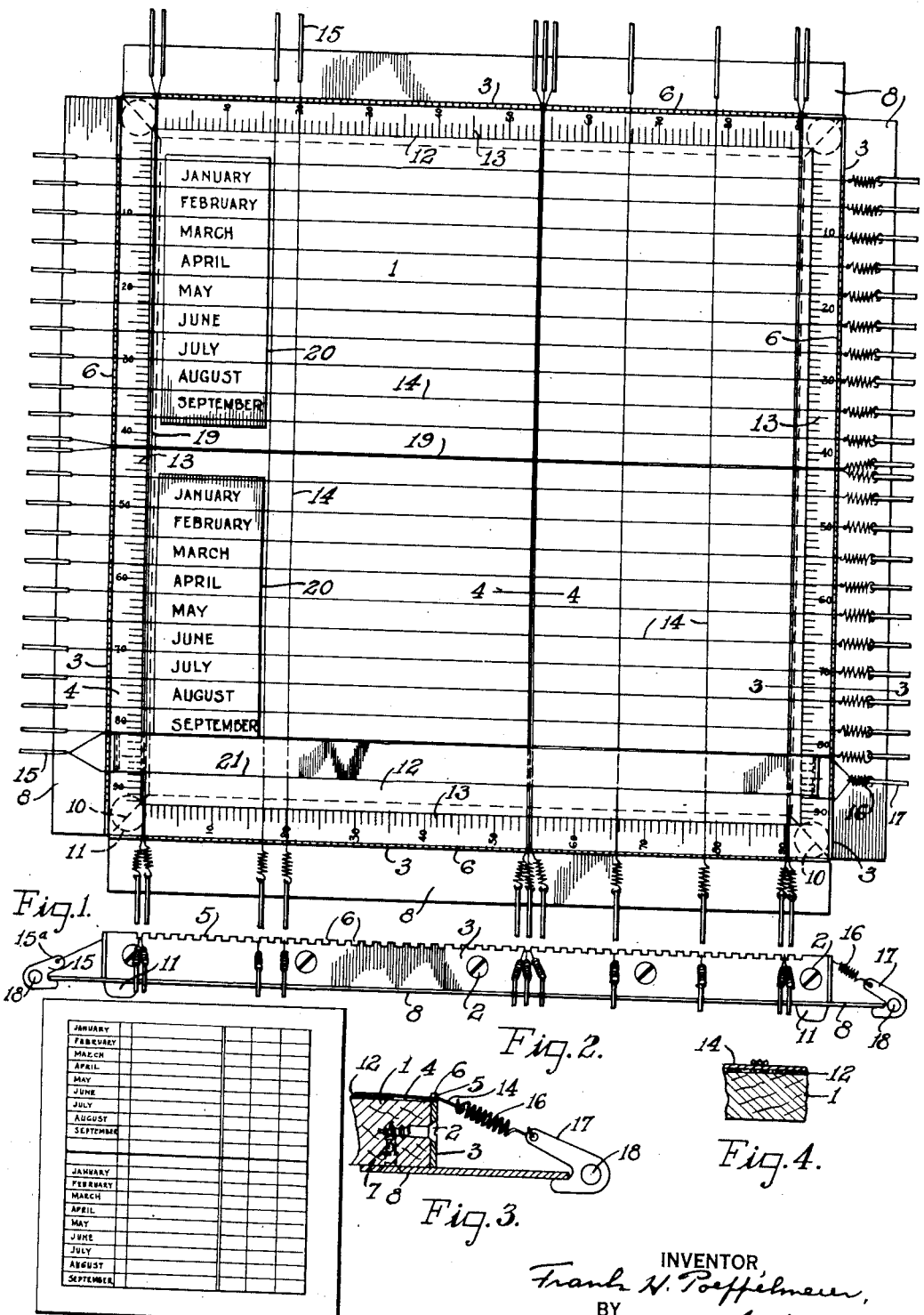

Patented Jan. 15, 1935

1,987,635

UNITED STATES PATENT OFFICE 1,987,635

METHOD OF, AND MEANS FOR, PREPARING FORMS FOR RULED CHARTS AND SHEETS

Frank H. Poeppelmeier, Dayton, Ohio, assignor, by mesne assignments, to Set-O-Type Manufacturing Company, Cleveland, Ohio, a corporation of Delaware Application December 17, 1931, Serial No. 581,660

25 Claims. (Cl. 95—85)

My invention relates to new and useful method of, and means for, preparing forms for ruled charts and sheets.

One of the principal objects of my invention is to provide a form to which opaque strands may be applied in any desired position, spacing or grouping from which sheets may be reproduced photographically for use in an offset printing process.

Another object of my invention is to provide on a form of this type graduations or an incised scale to assist in the correct positioning of the strands.

Another important object of my invention is to provide white sheets of paper on which printed matter such as columnar headings and other notations may be typed or printed and then inserted under the strands for reproduction with the ruling lines.

Still another object of my invention is the provision of wide opaque marginal bands with means for attaching them to the margin of the ruled form to prevent reproduction of undesired marginal lines.

Other important and incidental objects will be set forth in the following specification and claims subjoined thereto.

In the accompanying drawing, Figure 1 is a face view of my chart form showing a prepared ruling. Figure 2 is an end view of my chart form. Figure 3 is a sectional view taken on the line 3—3 of Figure 1 and showing the strand tension spring and clip. Figure 4 is a sectional view on the line 4—4 of Figure 1 and showing the method of producing closely spaced rulings. And Figure 5 is a view in reduced scale of a ruled sheet produced from the form and shown at Figure 1.

Referring to the drawing, the numeral 1 indicates a board or core, preferably square, and having attached to its surrounding edges by screws 2, spacing strips 3 of metal or other suitable material. These strips 3 project slightly above the top face 4 of the board 1 and their projecting edges 5 are provided throughout their length with equally spaced notches 6. The notches are spaced in any standard or desired system of measurement, vertically and horizontally, to receive correctly typed or printed matter that may be combined with the ruling. Also the width of the notches 6 are equal to one half of their center to center spacing. (See Figures 1 and 2.)

Secured to the under side of the board 1 by screws 7 or other suitable means, and projecting outwardly along the marginal edges of the board, are clip rails 8 of metal or other suitable material. Where these rails meet at the corners of the board, their adjacent faces 10 are mitered as shown at Figure 1. Rubber feet 11 are attached to the underside of the board at its corners to provide a clearance space below the clip rails. (See Figures 1, 2 and 3.)

Cemented or otherwise attached to the top face 4 of the board 1, with the even marginal edges of the board exposed, is a flat white opaque sheet 12 such as celluloid. (See Figure 1.)

On the exposed marginal edges of the top face 4 of the board 1, and between the sheet 12 and the spacing strips 3, are arranged embossed or incised lines 13, spaced in relation to the notches 6 and correspondingly numbered along opposite edges, as shown at Figure 1.

Now, in order to provide quickly changeable lines upon the face of the sheet 12, I have provided flat black strands 14, such as thread, cotton covered wire strands or catgut. These pass across the sheet 12 to be received by the proper notches 6. One strand end is provided with a hook shaped clip 15, to whose apertured end 15ᵃ the strand is secured.

The other strand end has attached thereto a small helical tension spring 16 to which another clip 17, like the clip 15, is secured. The springs 16 tend to keep the strands taut; also to provide a better finger grip. Each clip end, where it projects beyond the rail, has an aperture 18. When the strands are placed in their desired positions, with single strands for fine lines 14 and double strands 19 for heavier lines, printed matter on strips 20 of white paper may be inserted beneath the strands 14 where it will be retained by the tension of them, or these strips 20 may be attached to the board or master sheet by adhesives.

When the arrangement of the strands for the desired ruling is completed and the printed matter to be used is inserted, it is necessary to block out portions of the marginal lines where they extend beyond the desired composition; and for this purpose I have provided opaque white blocking strips 21 of pyralin or celluloid. These strips are provided at one end with one of the clips 15, and at the other end with one of the springs 16 and clips 17, to hold the strips tightly across the face of the strands.

In certain rulings it is necessary to provide double lines in close relation, and when this result is desired with this type of board, I use three strands as shown at Figure 4. These are composed of two outer black strands and a center white strand, which will produce the result shown at Figure 5.

From the foregoing description of my invention, it will be apparent that any type of ruling or spacing, either horizontally or vertically, or both, may be very quickly set up on my improved form, and that any desired printed matter can be easily inserted in the form in proper registration with the strands to enable immediate reproduction of the entire ruled form for use in offset printing or other desirable printing processes.

Having described my invention, I claim:

1. A means of the type described, comprising a board, a form-receiving sheet applied to said board, notched marginal edges for said board, the notches therein being spaced in any desired system of measurement, a plurality of strands, a hook on one end of each strand and a tension spring on its other end, and rails along the notched edges of the board to receive the hooks and springs on the strands after the latter have been inserted in the desired notches for a predetermined placement upon the sheet.

2. A means of the type described, comprising a rectangular board, scale graduations along each marginal edge of the board, strips containing notches opposite said graduations, secured to the marginal edges of the board, a form receiving sheet applied to said board, and strands removably placed in the notches opposite the desired graduations at the marginal edges of the board, to lie across said sheet.

3. A means of the type described, comprising a rectangular board, a form-receiving sheet applied stationarily to said board, strands secured to the board to lie across the sheet, and data-containing paper strips insertable under said strands for reproduction with the lines defined by the latter on the sheet.

4. A means of the type described, comprising a rectangular board, a form-receiving sheet applied to said board, strands secured to the board to lie across the sheet, data-containing paper strips insertable under said strands for reproduction with the lines defined by the latter, and blocking strips secured to the board over the strands and the marginal portions of said strips which project beyond the desired composition on the sheet.

5. A method of preparing a form for reproduction for an offset printing process, which consists in applying a form-receiving sheet stationarily to a holder, and then stretching strands across said sheet to define lines thereon, the sheets and strands presenting a light and dark contrast.

6. A method of preparing a double line on a form for reproduction by the offset printing process, which consists in applying a form-receiving sheet to a holder, and then stretching two black strands, with a white strand between them, over said sheet.

7. A method of preparing a form for reproduction for an offset printing process, which consists in applying a form-receiving sheet stationarily to a holder, stretching strands across the sheet to define lines thereon, and inserting data-containing strips on the sheet under said strands.

8. The combination of a base adapted to carry an image, strands adapted to lie over the same, anchoring means for the strands and springs interposed between each strand and one of its anchoring means.

9. The combination of a base adapted to carry data to be reproduced, there being a similarly spaced set of fixed notches on opposite sides of the board, and strands adapted to extend straight across the base and occupy said notches.

10. In an apparatus of the class described, the combination of a rectangular base, similarly spaced notches on opposite sides thereof, strands adapted to be stretched across the base and occupy corresponding notches, so that the strands will be parallel with each other, and springs for tensioning the strands.

11. The combination of a base, adapted to carry matter to be reproduced, a strand adapted to lie across the matter to be reproduced, a spring attached to the strand and a hook connected with the spring, whereby the strand may be tensioned and anchored to the base, the base having a ledge under which the hook may extend.

12. In an apparatus of the character described, the combination of a flat base adapted to receive an image to be reproduced, notched bars carried by the base at its opposite edges, projecting ledges carried by the base and strands adapted to occupy notches of the bars and having hooks adapted to engage the ledges.

13. The combination of a rectangular board, provided with projecting ledges at each of its four edges, said ledges comprising projecting plates secured to the bottom of the board, a set of strands adapted to extend crosswise over the board, said strands having hooks adapted to extend over the ledges.

14. The combination of a rectangular board, projecting ledges at the four edges thereof, four notched bars carried by the board at the edges, and having their notches adjacent the plane of the top of the board, strands adapted to extend across the board in two directions at right angles to each other, the strands occupying the notches of the corresponding bars, and hooks on the ends of the strands adapted to hook under the projecting ledges, whereby a form ruled and divided into columns may be produced.

15. In a device of the character described, the combination of a base adapted to hold an image, scale graduations on opposite sides of the base, an upwardly facing notch permanently associated with each scale graduation, and means for holding under tension strands which extend across the image and occupy the notches.

16. In an apparatus of the character described, the combination of a rectangular board, four bars secured to the edges of the board and extending upwardly beyond the same and provided with equally spaced notches, four ledges secured to the base of the board and projecting beyond its four edges, four scales carried by the face of the board adjacent the bars, opposite scales being equally graduated, strands adapted to extend in two directions at right angles to each other crosswise of the board, said strands occupying notches in the corresponding bars, a hook attached to one end of each strand and adapted to coact with one of the ledges, a spring at the other end of the strand, a hook attached to said spring adapted to coact with the ledge at that side of the board.

17. In an apparatus of the character described, the combination of means for holding a sheet to be reproduced and means for holding, stretched across the sheet, two parallel strands of a character adapted to be photographically reproduced and an intermediate non-photographic strand.

18. The combination of a board adapted to carry a sheet to be reproduced, means providing a pair of notches on the directly opposite sides of the board, three strands occupying said notches and drawn taut therein, the intermediate strand being of a non-photographic character and the two extreme strands being of a photographic character, whereby two parallel spaced lines may be reproduced.

19. A means of the type described, comprising a holder, a substantial white opaque form-receiving sheet stationarily mounted on said holder, and dark strands secured to the holder to lie across the sheet.

20. A means of the type described, comprising a board, a flat sheet applied stationarily to said board, a flat form mounted on the sheet and strands adjustably secured to the edges of the board to lie stationarily across said sheet and form.

21. A means of the type described, comprising a board, a form-receiving flat sheet applied stationarily to said board, bars at opposite sides of the board rising above the top plane of the board and having their exposed edges notched, and strands adjustably secured in said notched edges to lie across said sheet.

22. The method of making up a form for reproduction, comprising mounting a sheet of parallel printed lines on a flat member and stretching strands of a color contrasting with the sheet over the sheet to form rule lines between the printed lines on the sheet.

23. The method of making a reproducible form of ruled data for printing, comprising taking a sheet on which is an image of certain data to be reproduced arranged in transverse lines on a contrasting background and stretching strands of a color contrasting with the background over the sheet with the strands running at right angles to said lines to divide the matter into columns.

24. The method of making up a form for reproduction, comprising taking a sheet, light as to color, which has data thereon and stretching strands, dark as to color, across it in two directions at right angles to each other, to divide the data into lines and also into columns.

25. An apparatus for producing a ruled form for reproduction, comprising a base having a white opaque face adapted to carry an image to be reproduced, dark strands adapted to lie over the base and hooks for attaching the strands.

FRANK H. POEPPELMEIER.